(12) United States Patent
LaSusa

(10) Patent No.: US 7,344,611 B2
(45) Date of Patent: Mar. 18, 2008

(54) METHOD AND STRUCTURE FOR JOINING AND SEALING TWO COMPONENTS

(75) Inventor: Frank LaSusa, Layton, UT (US)

(73) Assignee: VinylLink LLC, Layton, UT (US)

( * ) Notice: Subject to any disclaimer, the term of this patent is extended or adjusted under 35 U.S.C. 154(b) by 511 days.

(21) Appl. No.: 10/854,188

(22) Filed: May 27, 2004

(65) Prior Publication Data
US 2004/0231283 A1  Nov. 25, 2004

Related U.S. Application Data

(63) Continuation-in-part of application No. 10/175,021, filed on Jun. 18, 2002, now Pat. No. 7,117,576, which is a continuation of application No. 09/679,220, filed on Oct. 3, 2000, now Pat. No. 6,678,934.

(60) Provisional application No. 60/157,625, filed on Oct. 4, 1999.

(51) Int. Cl.
*B32B 37/00* (2006.01)
(52) U.S. Cl. .................. 156/73.1; 156/258; 156/304.2; 156/304.3; 156/304.5
(58) Field of Classification Search .................. 156/64, 156/73.1, 73.5, 73.6, 304.1, 304.2, 304.3, 156/304.5, 304.6, 580, 256, 258; 228/112.1, 228/2.1; 428/57
See application file for complete search history.

(56) References Cited
U.S. PATENT DOCUMENTS 5,902,657 A  5/1999  Hanson et al.
6,103,035 A  8/2000  Hanson et al.
7,122,088 B2 * 10/2006  Field et al. ................. 156/73.5
2004/0108040 A1 * 6/2004  Field et al. ................. 156/73.6

FOREIGN PATENT DOCUMENTS

WO  WO 02/098635 A1 * 12/2002

* cited by examiner

*Primary Examiner*—James Sells
(74) *Attorney, Agent, or Firm*—Manelli Denison & Selter; Edward J. Stemberger

(57) ABSTRACT

A method of joining two components of a vinyl frame provides first and second components each having an end and having surfaces defining at least one channel open at the end and extending into the associated component. A coupling structure is provided and has at least a first member and a second member and includes energy receiving structure. The first member is inserted to extend at least partially into the channel of the first component and the second member is inserted so as to extend at least partially into the channel of the second component so that the energy receiving structure is generally adjacent to certain surfaces defining the associated channel. Energy is directed to the coupling structure to cause the energy receiving structure to fuse with the certain surfaces, thereby joining the first and second components together. Improved component sealing and water pathways are also provided.

30 Claims, 11 Drawing Sheets

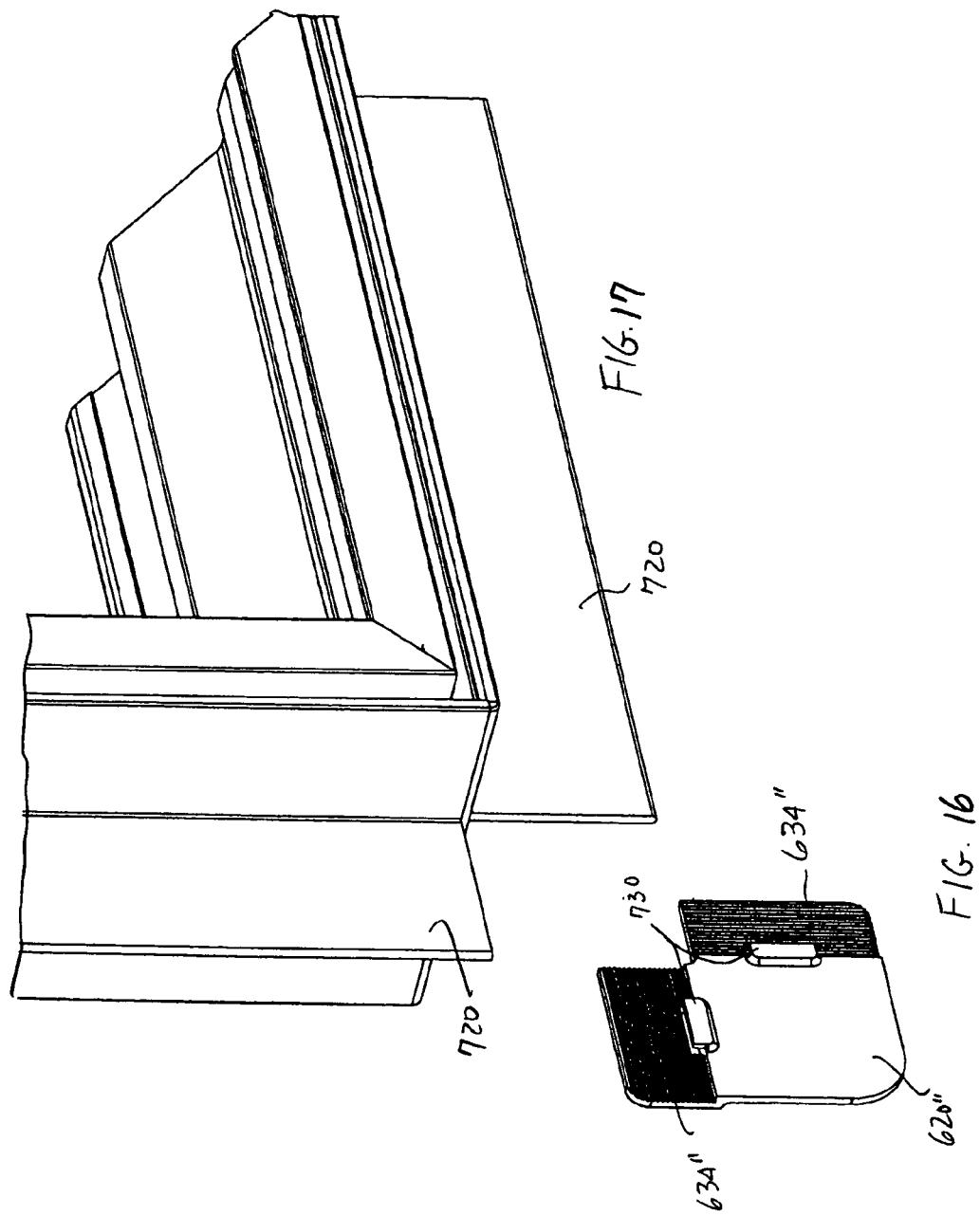

METHOD AND STRUCTURE FOR JOINING AND SEALING TWO COMPONENTS

This application is a Continuation-in-Part of U.S. patent application Ser. No. 10/175,021 filed on Jun. 18, 2002, now U.S. Pat. No. 7,117,576, which is a continuation of U.S. patent application Ser. No. 09/679,220, filed on Oct. 3, 2000, now U.S. Pat. No. 6,678,934 B1, which in turn is based on Provisional Patent Application Ser. No. 60/157,625, which was filed on Oct. 4, 1999, and priority is claimed thereto.

FIELD OF THE INVENTION

This invention relates to the joining and sealing of two components and, more specifically, to the manufacture of window systems using polymer based or metallurgy based component parts that are joined so as to have structural integrity. In addition, this invention discloses additional functionality of an internally designated or encapsulated coupling device to control the channeling of water while creating enhanced structural integrity to the substrate as well as an external and internal seal.

BACKGROUND OF THE INVENTION

A variety of methods and process for the construction of window system assemblies have been proposed. Typically, these prior methods and processes require costly, complex, inconsistent, error and waste prone, susceptible to defects manufacturing steps. Generally, these prior methods and processes require a large number of pieces of equipment and skilled craftsmen. For general background, the reader is directed to the following United States Patent Nos., each of which is hereby incorporated by reference in its entirety for the material contained therein: U.S. Pat. Nos. 2,037,611, 2,047,835, 2,219,594, 2,781,111, 2,952,342, 3,074,772, 3,087,207, 3,287,041, 3,305,998, 3,315,431, 3,327,766, 3,348,353, 3,376,670, 3,484,126, 3,802,105, 3,854,248, 4,269,255, 4,327,142, 4,407,100, 4,460,737, 4,597,232, 4,941,288, 5,155,956, 5,189,841, 5,491,940, 5,540,019, 5,555,684, 5,585,155, 5,603,585, 5,620,648, 5,622,017, 5,799,453, 5,901,509, 6,047,514 and 6,073,412. The reference to these related U.S. patent documents is not an admission of prior art, as the inventor's date of invention may predate the date of filing and/or publication of these references.

Conventionally, in vinyl window systems, the corners of the window are defined by cooperating miter-cut ends of two frame components that are joined by butt-joint thermal hotplate welding. However, since the frame components do not have significant surface area at the abutting joint, the welded joint is not as robust. Furthermore, the conventional hotplate welding results in undesirable divots, protrusion, score lines, etc. at the joint, and most seams need to be cleaned or scraped to be more aesthetically pleasing. Furthermore it is most common since this application includes the segregation of the components, which typically means the joined or abutted components are of various profiles or lineal pieces produced at alternate time frames. It is common in this process that the two components are not siblings and due to the nature of the extrusion process these pieces create quality deficient finishes.

One of the largest drawbacks of today's hot plate welding methods, are long cycle times for completing the complete process. The conventional process consists of an alignment plate, for squaring up the ends of the extrusion that are going to be heated up. After the two adjoining components are squared up against an alignment plate, a hot plate is inserted between the two frames or sash component members and heated for an average cycle of 15 to 25 seconds. After the heating cycle is complete, the two ends are merged together to melt and produce a thermal weld. A cooling cycle is required before part can be removed from its tooling fixture and sent to the cleaning station. The heating cycle alone can take an average of 45 to 60 seconds for each corner. One of the common ways window manufactures increase throughput is by welding 4 corners at once, or by stacking several frames in multiple fixtures to gain efficiencies. One item that remains constant through this process is the need for a 45 to 60 second cycle per corner plus the additional cleaning time, of which the spew or flashing can cause deflection of the required cutter stack used in the clean up process and create either a tear in the seam or dislodging of a major portion of the frame and make the window non-usable.

Another drawback is the timeframe rendered in the production process to reveal out of square windows and/or the hardships faced by the end-users of such finished goods when placement in the hole or setting location. Framers, contractors and homeowners face a daunting task in the installation process due in part to such a varying tolerance in the external spew of flashing left in the corner from this hotplate thermal welding process.

Furthermore, the corners of a window should be sealed so that water can flow and exit through weep holes provided in the frame or sash. When thermal welding is used to join corner segments of a window the surface area exposed to this application is very minimal and the surface bond which can leave unwanted voids in the frame whereas air and water infiltration or leaks can occur, flash may be left behind from the thermal weld that can obstruct or block the flow of water to the weep holes.

Thus, there is a need to provide a method of joining and sealing two components such as window frame components to define a robust corner having smooth seams that will prevent cracking and leaking at the corners from outside elements such as rain and condensation and that provides a sealed structure whereby increased surface coverage as much as 10 times the current process occurs and specially designated channeling of water creates free flowing waterways to the drainage ports or weep holes.

SUMMARY OF INVENTION

An object of the invention is to fulfill the need referred to above. In accordance with the principles of the present invention, this objective is achieved by a method of joining two components, while creating internally and externally enhanced structural integrity to the frames system as well increasing the seal on the internal and external perimeter of the channeled profile, additionally providing a channel for water to travel through the corner to provide enhanced weeping functionality. The method provides first and second components each having an end and having surfaces defining at least one channel open at the end and extending into the associated component. A coupling structure is provided in a singular form or that has at least a first member and a second member and includes energy receiving structure. The singular structure is then inserted into the channel of the first component and is extending outward as so to catch or become encapsulated into the second member or in the case of a coupling structure that exhibits multiplicity in origin whereas the first member is inserted to extend at least partially into the channel of the first component and the second member is inserted so as to extend at least partially into the channel of the second component so that the energy receiving structure is generally adjacent to certain surfaces defining the associated channel. Energy is directed to the coupling structure to cause the energy receiving structure to fuse with the certain surfaces, thereby joining the first and second components structurally together, while also creating a seal at the joined surfaces.

In accordance with another aspect of the invention, a method of forming a corner of a structure includes receiving material for processing, the material having surfaces defining at least one channel therein, cutting the received material to a desired length, forming at least one notch in the material by cutting the material at certain angles, the notch defining ends of first and second components, the first component including a first portion of the at least one channel and the second component including a second portion of the at least one channel, providing a coupling structure having at least a first member and a second member, inserting the first member to extend at least partially into the first portion of the at least one channel and inserting the second member so as to extend at least partially into the second portion of the at least one channel, moving at least one of the first and second components so that the ends of the first and second components are in generally abutting relation thereby defining a corner, and directing energy to the coupling structure to cause at least portions of the coupling structure to fuse with at least portions of the surfaces defining the at least one channel, thereby joining the first and second components together creating a structurally enhanced finished product and a superior sealing system.

In accordance with yet another aspect of the invention, a coupling structure is provided that is constructed and arranged to be fused with at least one other component. The coupling structure includes a body, and energy receiving structure extending from the body. The energy receiving structure is constructed and arranged to fuse with the component when energy is directed to the energy receiving structure.

Other objects, features, functionality and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF DRAWINGS

In order to show the manner that the above recited and other advantages and objects of the invention are obtained, a more particular description of the preferred embodiment of this invention, which is illustrated in the appended drawings, is described as follows.

FIG. 16 is a perspective view of another embodiment of the coupling structure of the invention for use as a corner of a nail fin.

FIG. 17 is a perspective view of a window corner having a nail fin.

The reader should understand that the drawings depict only a present preferred and best mode embodiment of this invention, and are not to be considered as limiting in scope.

Reference will now be made in detail to the present preferred embodiment of the invention, examples of which are illustrated in the accompanying drawings.

DETAILED DESCRIPTION OF THE PRESENTLY PREFERRED EXEMPLARY EMBODIMENTS

Figure 1A:
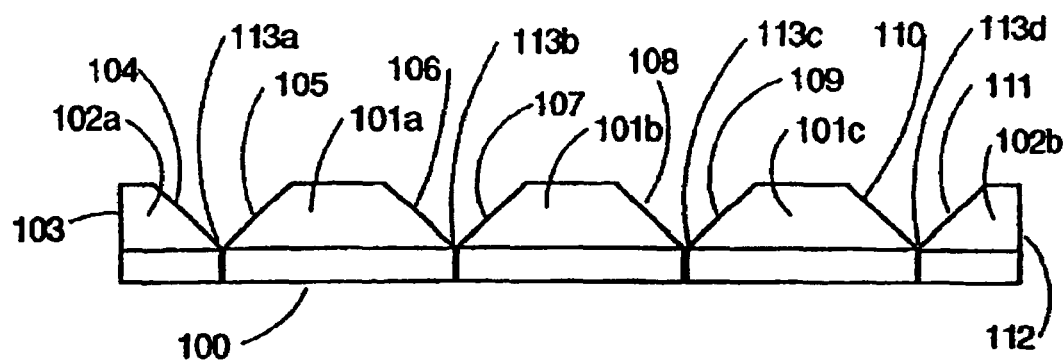
FIG. 1a is a window component profile, manufactured using the process of this invention.
Figure 3A:
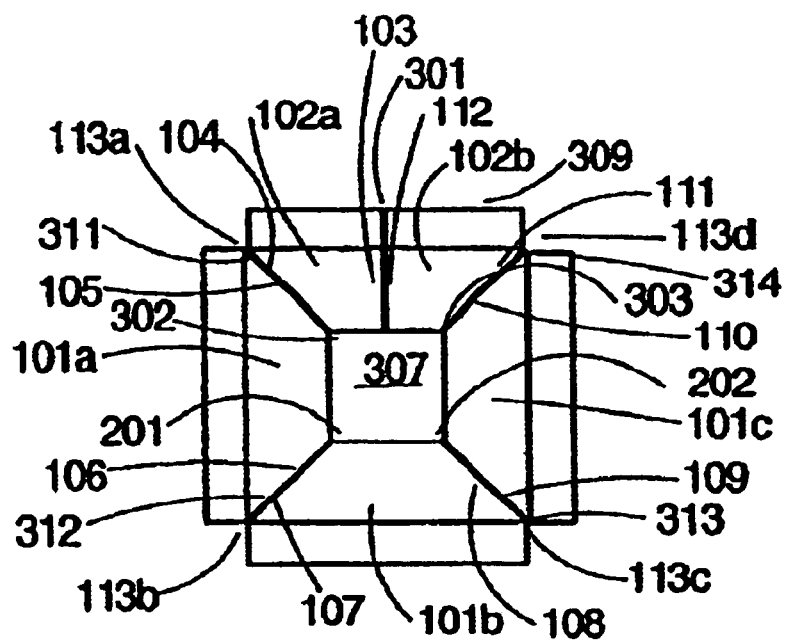
FIG. 3a is a completed window component in the final stage ready for installation.

FIG. 1a shows a window component profile, manufactured using the process of this invention. This preferred embodiment of the window component has three generally elongate sections 101a, 101b, 101c and two half sections 102a, 102b, each connected 113a, 113b, 113c, 113d to an adjacent section. In alternative embodiments, when it is desired to have windows with non-rectangular shapes, the number of sections can be increased or reduced. For example, a triangular shaped window may have only two long sections and two half sections. In another example, an octagonal shaped window may have seven long sections and two half sections. The connections 113a, 113b, 113c, 113d are flexible permitting a bend at the connection 113a, 113b, and 113c, 113d. The preferred elongate sections 101a, 101b, 101c and half sections 102a, 102b are preferably made of a composite material, molded, cut, milled, routed or otherwise shaped in to the desired generally decorative shape. While the sections 101a, 101b, 101c are shown, in this embodiment, as being of generally the same length, in alternative embodiments, the sections 101a, 101b, 101c may have different lengths as appropriate to the desired window shape. Each section 101a, 101b, 101c is provided with two diagonal cut sloped portions (respectively 105, 106; 107, 108; and 109, 110). These diagonal cut sloped portions 105,106, 107, 108, 109, 110 are shown having an angle of 45 degrees, however, in alternative embodiments this angle may be either increased or decreased as necessary in order to facilitate the joining of two adjacent diagonal sloped portions, to thereby produce a window component having the desired shape. The ends 103 and 112 are, in this embodiment, at approximately 90 degrees from the base 100 of the window portions, thereby facilitating the joining of the ends 103, 112, as shown in FIG. 3a.

Figure 1B:
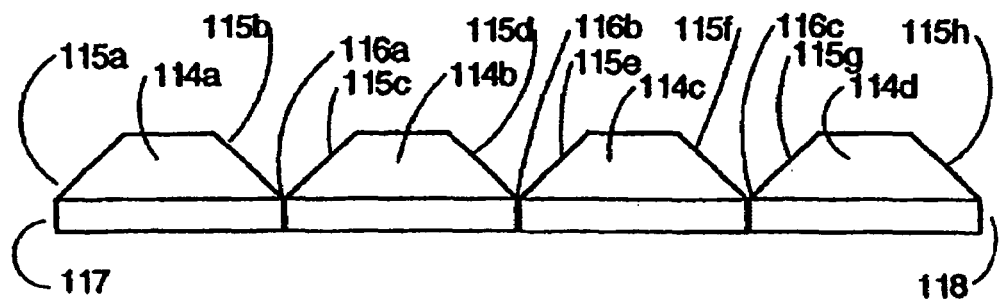
FIG. 1b is an alternative window component profile, manufactured using the process of this invention.
Figure 3B:
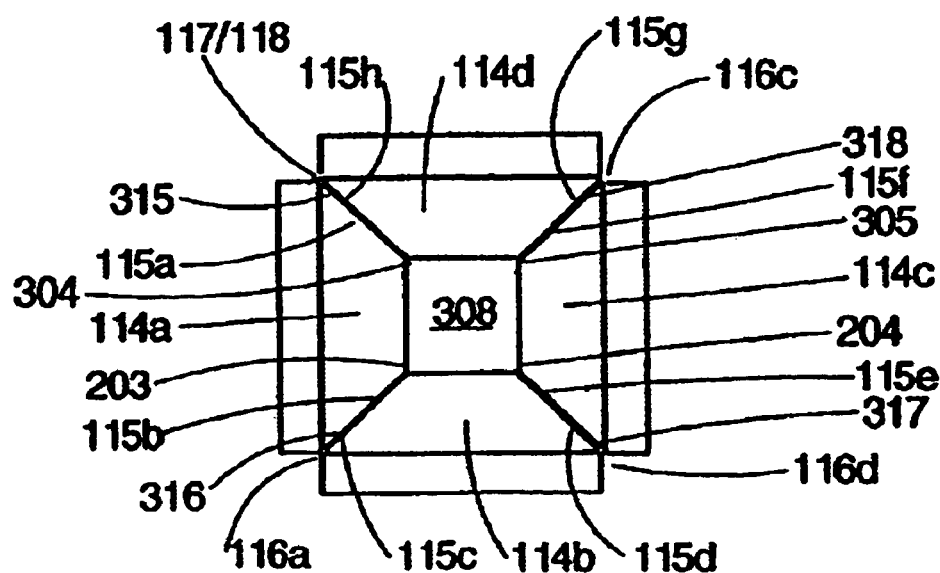
FIG. 3b is an alternative completed window component in the final stage ready for installation.

FIG. 1b shows an alternative window component profile, manufactured using the process of this invention. This second preferred embodiment of the window component has four generally elongate sections 114a, 114b, 114c, 114d each connected 116a, 116b, 116c to an adjacent section. In alternative embodiments, when it is desired to have windows with non-rectangular shapes, the number of sections can be increased or reduced. For example, a triangular shaped window may have only three long sections. In another example, an octagonal shaped window may have eight long sections. The connections 116a, 116b, 116c are flexible permitting a bend at the connection 116a, 116b, 116c. The preferred elongate sections 114a, 114b, 114c, 114d are preferably made of a material, molded, cut, milled, routed or otherwise shaped in to the desired generally decorative shape. While the sections 114a, 114b, 114c, 114d are shown, in this embodiment, as being of generally the same length, in alternative embodiments the sections 114a, 114b, 114c, 114d may have different lengths, as appropriate for the desired window shape. Each section 114a, 114b, 114c, 114d is provided with two diagonal cut sloped portions (respectively 115a, 115b; 115c, 115d; 115e, 115f; 115g, 115h). These diagonal cut sloped portions 115a, 115b, 115c, 115d, 115e, 115f, 115g, 115h are shown having an angle of 45 degrees, however, in alternative embodiments this angle may be either increased or decreased as necessary in order to facilitate the joining of two adjacent diagonal sloped portions, to thereby produce a window component having the desired shape. The joining of the ends 117, 118 are as shown in FIG. 3b to form the complete window component.

Figure 2A:
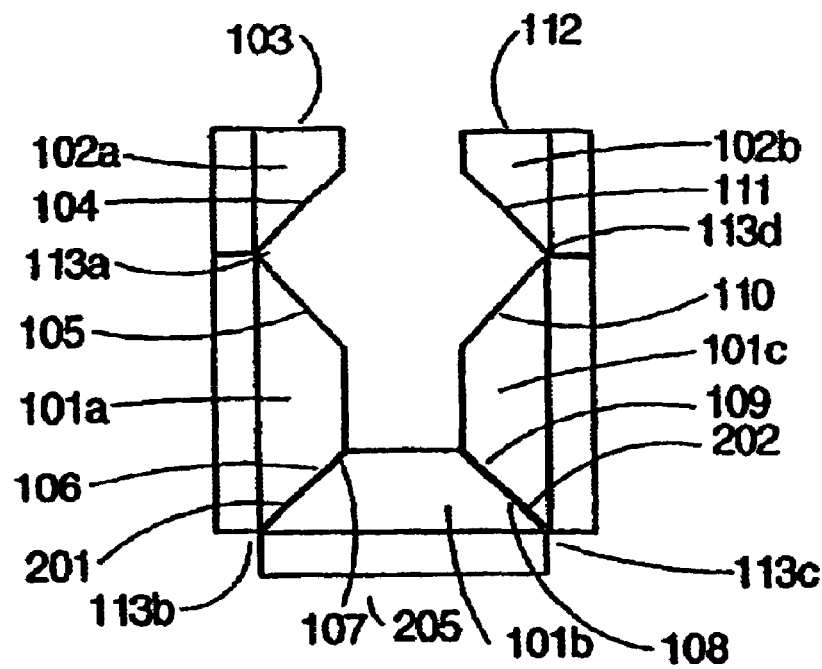
FIG. 2a is a window component profile in the rotational stage of the process of this invention.

FIG. 2a shows a window component profile in the rotational stage of the process of this invention. This view shows the window component of FIG. 1a, with the diagonal sloped portions 106, 107 and 108, 109 brought into contact and joined to form corners 201, 202 and thereby the bottom 205 of the window component.

Figure 2B:
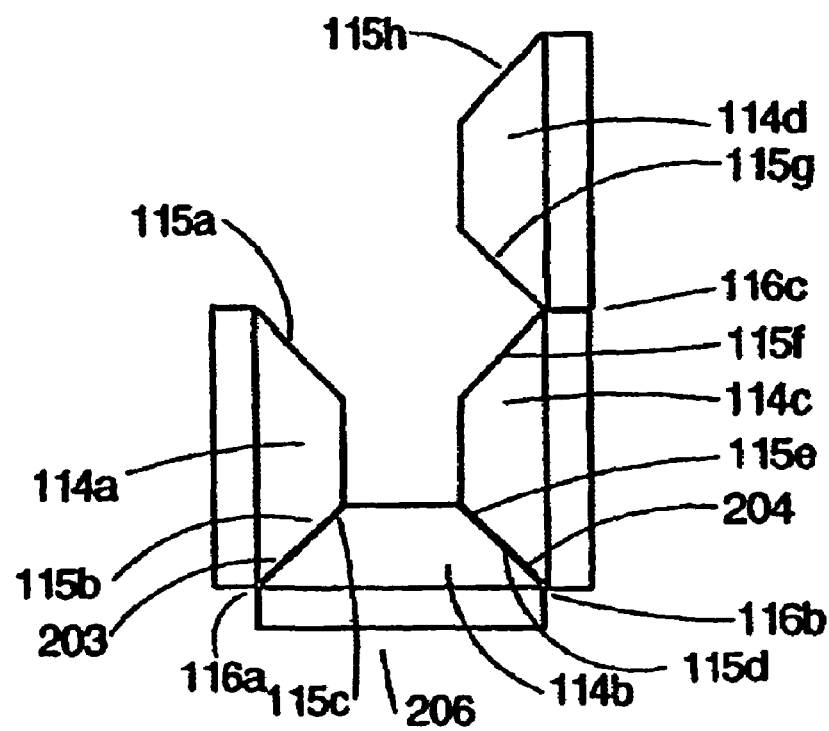
FIG. 2b is an alternative window component profile in the rotational stage of the process of this invention.

FIG. 2b shows an alternative window component profile in the rotational stage of the process of this invention. This view shows the window component of FIG. 1b, with the diagonal sloped portions 115b, 115c and 115d, 115e brought into contact and joined to form corners 203, 204 and thereby the bottom 206 of the window component.

FIG. 3a shows a completed window component in the final stage ready for installation of the window component of FIG. 1a. Ends 103 and 112 are connected forming a joint 301 at the top 309 of the window component. Diagonal sloped portions 104, 105 and 110, 111 are brought into contact and joined to form corners 302 and 303 and to define an interior 307 suitable for holding and retaining glass or other similar transparent or semi-transparent material. The joints 301, 311, 312, 313, 314 are typically and preferably made using Sonic applications or energy directed techniques as described below, although alternatives such as adhesive, bolts, screws, pins, clips and the like can be substituted without departing from the concept of this invention.

FIG. 3b shows a completed window component in the final stage ready for installation of the window component of FIG. 1b. Ends 117 and 118 are connected forming a joint 315 of the diagonal sloped portions 115a, 115h, thereby forming a corner 304. Diagonal sloped portions 115f, 115g are brought into contact and joined to form corner 305 and to define an interior 308 suitable for holding and retaining insulating glass or other similar transparent or semi-transparent material. The joints 315, 316, 317, 318 are typically and preferably made using Sonic applications or energy directed techniques as described below, although alternatives such as adhesive, bolts, screws, pins, clips and the like can be substituted without departing from the concept of this invention.

Figure 4:
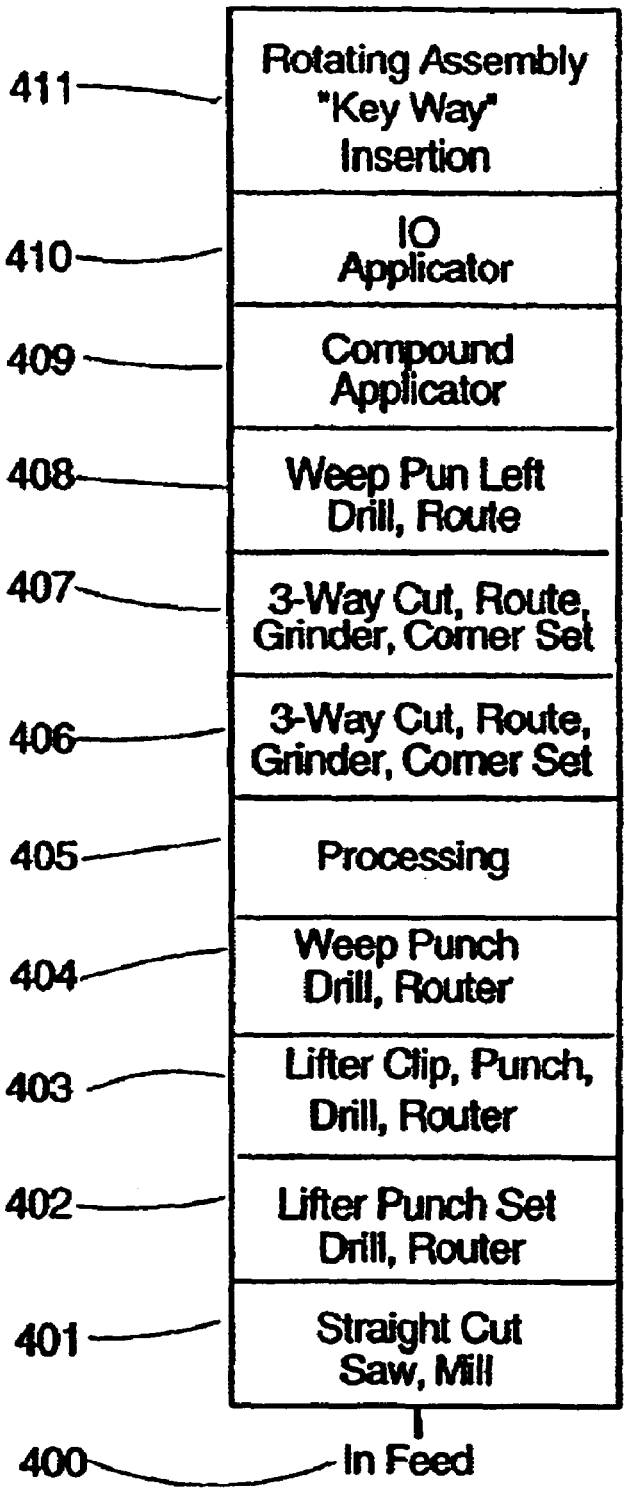
FIG. 4 is a process flow diagram of the preferred method of this invention.

FIG. 4 shows a process flow diagram of a method of this invention. Initially, the material is fed 400 into the assembly process. Next, the material is straight cut 401 preferably by a saw or mill machine. The cut material is set 402 for Lifter or Balance Holding punch, preferably on a drill or router machine. The material is then punched 403 for the lifter clip, also preferably on a drill or router machine. Weep punching 404 is next performed on the material, again typically using a punch, drill or router machine. These punching steps are used to provide ventilation and drainage points in the window component. Miscellaneous processing 405 is performed to remove loose material and/or rough edges. A first three-way cut, or notch, 405 is made, to produce diagonal portions, preferably using a cutter, grinder, or corner set. A second three-way cut 406 is made, to produce additional diagonal portions, also preferably using a cutter, grinder or corner set. A second weep punch 408 is made to further provide additional drainage and ventilation, preferably using a drill or router machine. In step 409, a polymer compound is applied to the joint regions thereby providing durable, flexible corners. Identification markings are applied 410 to permit control and tracking of window components. The assembly or window component is rotated with the corner and/or end portions joined together using adhesive, screws, bolts, clips, pins or the like forming the complete window component ready for the insertion of the transparent medium and for installation in the building structure.

Figure 5:
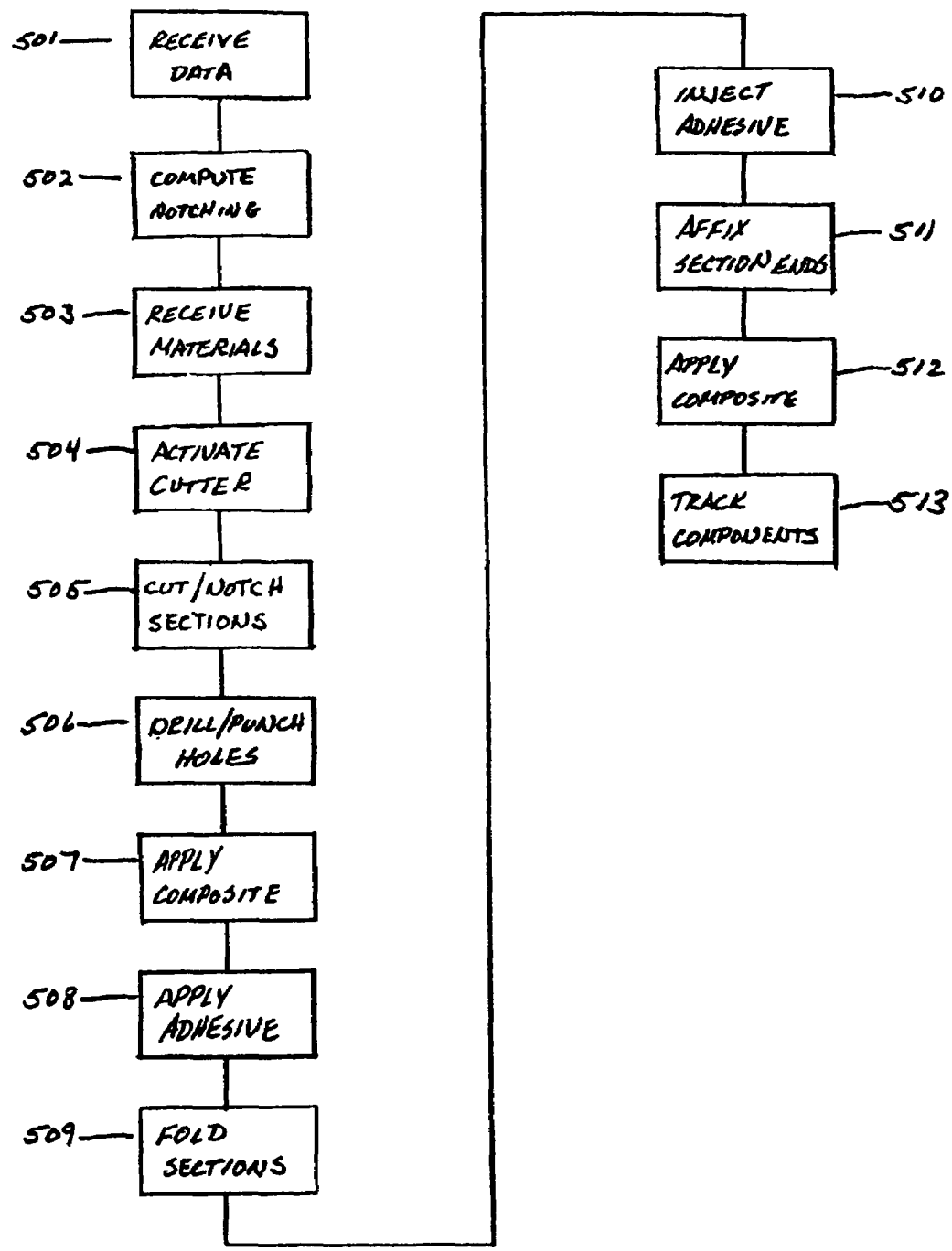
FIG. 5 is a detailed flow chart of the present, typically although not necessarily automated, process of this invention.

FIG. 5 shows a detailed flow chart of the present, typically although not necessarily automated, process of this invention. This present embodiment of the invention may employ automation techniques and technology to improve the quality and consistency of the manufacturing process while simultaneously reducing labor and material costs. Although the steps of the process shown in this FIG. 5 accommodate automation technology, the reader should understand that in alternative envisioned embodiments, the steps can be performed in a manual fashion. Data profiles are received 501 by a control processor. A typical control processor is a programmable computer, although alternative processors, such as single purpose electronic devices could be substituted without departing from the concept of this invention. The data profiles include information related to the desired window shape, size, texture, color, frame material (also referred to herein as construction material), glass or other medium type and/or other features typically specified in the construction of window frames. Frame window materials are typically selected from but are not necessarily limited to composites, plastic, metal, and wood reinforced with a foldable back portion. Textures include patterns, roughness and the like in the surface of the construction material.

Window shapes supported by this invention include square, rectangular, triangular, octagonal, and other polygonal shapes, circular, oval and other curved shapes. Moreover, the window shapes may be either an irregular or normal polygon, and includes trapeziums, half rounds, and ellipses. The data profile also typically includes dimensional information, such as height, width and thickness of desired frame(s). This dimensional information may be input, or received by the processor in various units, including either English units (inches, feet, yards) and/or metric units (centimeters, meters). The data profile also includes information concerning the type and size of desired transparent, or semi-transparent, material. Typically, this material is glass, although plastic, acrylic, composite or other generally transparent, window compatible material can be substituted without departing from the concept of this invention. Also, typically described in the data profile is the frame material, color and texture used and desired, as well as such other window-type features, such as single pane windows, double pane windows, horizontal sliders, single or double hung sliders, patio doors, shaped windows, picture windows, and other types of windows known in the art.

The control processor, which may be a distributed processor in communication with a processor receiving the data, a separate processor computing, and a still other processor controlling the manufacturing equipment and perhaps a further processor tracking the process of the window components through the process of this invention, computes 502 the cutting and notching of the received material. This computation step 502 preferably includes calculating the length of window frame components (which will be produced from the received material) calculates and/or selects the positioning of the notches within each window frame component, as well as the angle of the sloped or "notch" portion as well as the distance between notches. In general, for a regularly shaped square or rectangular window, the notch angles would be 45 degrees and the number of elongated sections would be four, while for an octagon the notch angles would be 22.5 degrees and the number of elongated sections would be eight. In order to provide certain curved window shapes the notch angles may also be non-linear. The notch angles are selectable generally from 0 degrees to 180 degrees to provide for a selection of a generally continuous set of window shapes. The number of notch angles is also selectable, with four angles in each notch being typical. The data treatment calculation may include tolerance ranges from 0.000 inches to 0.500 inches to account for potential stretching of various construction materials. Construction materials are received 503. Typically, these construction materials are received in a single piece form and often have a nail fin provided on the outer surface area. A cutter is provided to perform the cutting operation for cutting the received construction materials to the required length of the window frame component and to create the notches defining the sections (also referred to as elongated sections) of the window component. Typically, this cutter is a mill, router, saw, compression metal cutter, high-pressure water jet cutter, heat or torch cutter, and the like. A wide variety of construction materials may be used with this invention, including, but not necessarily limited to vinyl, plastic, polymers, wood, metal, fiberglass and/or other composite materials.

Once the construction materials are received 503, the processor activates 504 the cutter using the notching sequences previously calculated to perform the cutting and notching sequences on the construction material to produce a linear physical profile. In the present embodiment this activation 504 is a batch computation process. In the present embodiment, a mill cuts 505 the construction material to length and cuts the angled notches in the construction material to define the sections. In one present embodiment the angled notches are made sequentially, in other embodiments multiple angled notches are made simultaneously or at least with several cutters operating independent from each other. In one embodiment of the process movement of the construction material is done automatically, while in other embodiments, a person may be required or prompted to move the material as required to position for angled notching. In some embodiments, the angled notches define sections of equal length, in other embodiments; the angled notches define sections of unequal length. Typically, a three-way notch or cut is provided to produce the diagonal partial cut-through notches of the present embodiment. Drilling or punching 506 operations may then be performed to introduce openings in the construction material for drainage, air filtration, placement of hardware, routing of conduit and/or dimpling. A composite material may then be applied 507 to the surface of the construction material to improve flexibility, durability and weather proofing of the resulting frame. The selected composite material applied is selected to be appropriate to the construction material, and is typically a polymer compound with high temperature tolerance and moisture resistance. An adhesive material, typically a chemical or polymer adhesive, could be applied 508 to the angled notch portions to assist in the adhesion of the after folded corners or the preferable method would be Sonics or energy directed applications.

After the typically batch system has completed cutting operations 505, the construction material is folded 509 to form one or more corners from the ends of the individual sections. During and/or after the folding step 509 additional adhesive may be injected to provide a seal in the folded corners. After folding 509, the construction material takes on the shape of the desired window shape, such as a square, rectangle or other selected shape identified in the received 501 data, and an interior adapted to hold in place the selected transparent medium. The selected transparent medium is typically glass, although alternatives including plastic, acrylic and other similar transparent or semi-transparent materials can be substituted without departing from the concept of this invention. In an alternative embodiment, the construction material is folded 509 after each angled notch cutting operation 505, so that with each fold, the appearance of the material increasingly resembles the desired shape and selected data profile. A second typically polymer composite, adhesive, material could be injected 510 in each corner thereby affixing the construction material in the desired shape or the more preferable the use of Sonic or energy directed applications would take place. This second polymer composite also enhances the seal in the corners and may be used to retain the transparent medium in place in the interior of the frame component. After folding the section ends, including the ends (see 103 arid 112 of FIG. 1a) of the component and the angled notches (cumulatively now corners) are fixed 511 in place, typically through the injection of the second polymer, through the use of the adhesive of step 508 or alternatively by the use of metal joining or metallurgical process (such as welding and the like) or mechanical fastener devices (such as screws, brackets, bolts and the like). Composite material is typically applied 512 to the exterior portions of the construction material to provide a desired finish to the frame component. Throughout the process of this invention, the components are presently tracked 513 for inventory and quality control purposes. In some embodiments, the tracking 513 may be facilitated by identification marking of the window components, construction materials and/or sections for automatic or manual detection.

Figure 6:
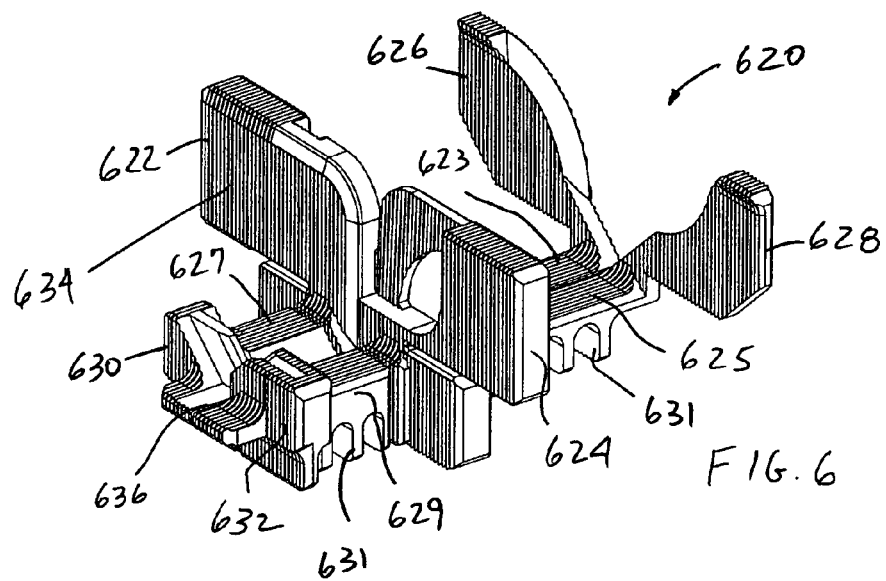
FIG. 6 is a perspective view of a coupling structure provided in accordance with the principles of the invention.
Figure 7:
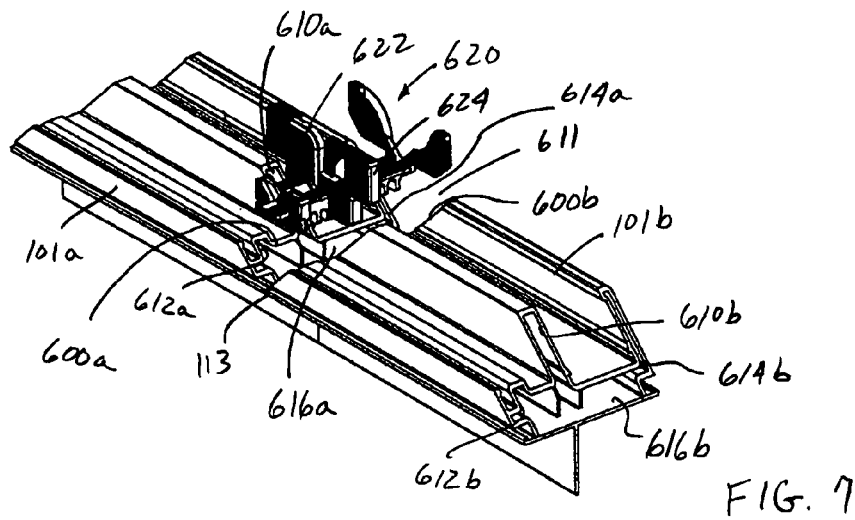
FIG. 7 is a perspective view of the coupling and sealing structure of FIG. 6 shown in position to be placed into a notch defined between two components of a window.

In order to make the corners of the window system even more robust, in accordance with another aspect of the invention, a coupling structure, generally indicated at 620 in FIG. 6, is to be secured in each corner of a frame. FIG. 7 shows two sections or components 101*a*, 101*b* of a frame joined by a flexible hinge connection 113. The respective ends 600*a*, 600*b* of the components 101*a*, 101*b* include the above-mentioned diagonal cuts.(forming a notch 611) so that when joined, cooperate to define a corner of the frame, as will be explained more fully below. It can be appreciated that the two components can be separated, (e.g., not having the hinge connection 113). As shown in FIG. 7 each component 101*a*, 101*b* has surfaces defining at least one respective channel 610*a*, 610*b* open at the end or notch 611 and extending into the associated component. In the illustrated embodiment, each component 101*a*, 101*b* includes a central channel 610*a*, 610*b*, side channels 612*a*, 612*b*, and 614*a*, 614*b*, and a bottom channel 616*a*, 616*b*, respectively. Due to the notch 611, each channel in component 101*a* appears to be separate from each channel in components 101*b*. However, the channels 610*a* and 610*b* can be considered to be portions of the same channel. This applies to channels 612, 614 and 616 as well.

In the embodiment of FIG. 6 the coupling structure 620 has at least a first member 622 and a second member 624 operatively associated with the first member 622. Members 622 and 624 can be separate members or integral members. As shown, the coupling structure also includes co-operating members 626 and 628 at one end thereof, and co-operating members 630 and 632 at the other end thereof. Cooperating first bridging members 623, 625 extend between members 622, 624 and the members 626, 628, and cooperating second bridging members 627, 629 extend between the members 622, 624 and the members 630, 632. Each bridging member 623, 625, 627 and 629 includes elongated channels 631 there-through defining pathways to permit water and air to pass when disposed in the bottom channel 616 as will become apparent below. Bridging members 623 and 627 can be considered to be a single structure and bridging members 625 and 629 can also be considered to be a single structure.

The coupling structure 620 include energy receiving structure 634 on at least a portion of the periphery thereof so as to be disposed generally adjacent to certain surfaces defining the associated channel 610*a*, 610*b*, 612*a*, 612*b*, 614*a*, 614*b*, 616*a*, 616*b*, when the members 622, 624, 626, 628, 630, 632, 623, 625, 627 and 629 are disposed in a respective channel. In the illustrated embodiment, the energy receiving structure 634 is in the form of spaced ribs that extend from the coupling structure, but are not limited to this configuration. The energy receiving structure 634 can be of any configuration that can be caused to be fused to other surfaces, as will be explained below.

Figure 10:
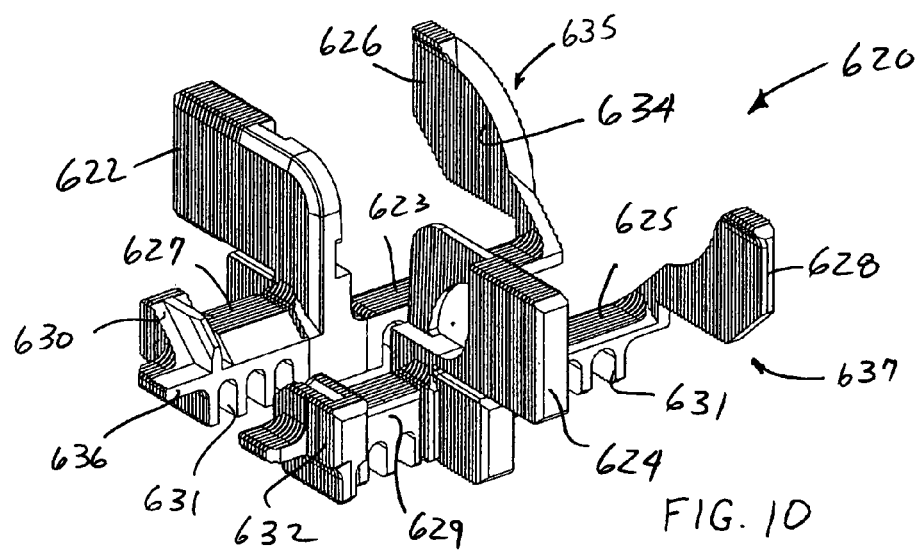
FIG. 10 is a perspective view of the first and second portions of the coupling structure FIG. 9.

In the illustrated embodiment and best shown in FIG. 10, members 624, 623, 626 627 and 630 are integral and form a first portion 635 of the coupling structure 620 associated with component 101*a*. Members 622, 625, 628, 629 and 632 are integral and define a second portion 637 of the coupling structure 629 that is associated with component 101*b*. Preferably, the first and second portions 635, 637 of the coupling structure 620 are joined (FIG. 6) by a breakable portion or seam 636 so that the coupling structure 620 can be placed with respect to components 101*a*, 101*b* in one movement. Thereafter, the breakable portion can be broken to separate the two portions of the coupling structure 620 (FIG. 10).

Figure 8:
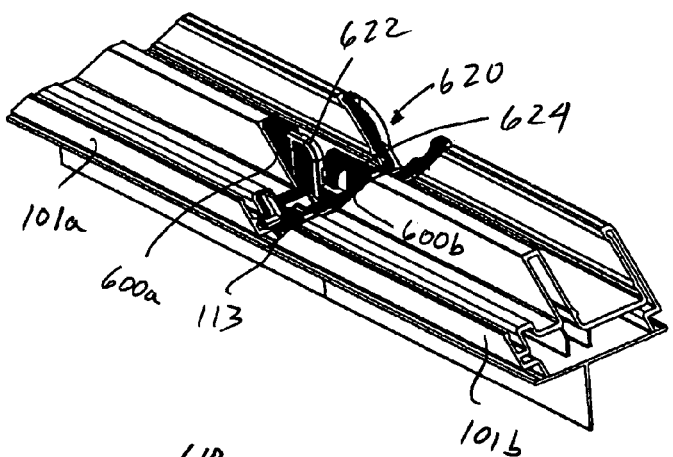
FIG. 8 is a perspective view of the coupling and sealing structure of FIG. 6 shown in inserted into the notch between the components of FIG. 7.
Figure 9:
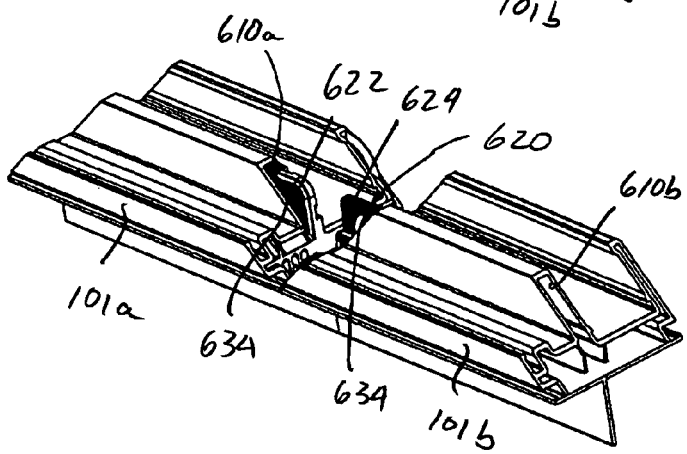
FIG. 9 is a perspective view of coupling structure of FIG. 6 shown with a breakable portion thereof in a separated condition defining first and second portions of the coupling structure with a portion being disposed in channels of an associated component.

A method of joining the coupling structure 620 to the components 101*a*, 101*b*, will be described with regard to the first and second members 622, 624, and the channels 610*a*, 610*b*, respectively, for ease of explanation. With reference to FIG. 7, the first and second components 101*a*, 101*b*, are oriented to be disposed more than 90 degrees apart (e.g. 180 degrees as shown) with respect to the hinge connection 113. The coupling structure 620 is positioned with respect to the first and second components 101*a*, 101*b*. Next, as shown in FIG. 8, the coupling structure is further assembled with the first and second components 101*a*, 101*b* and the breakable portion 636 is broken so that the first and second portions 635, 637 of the coupling structure 620 and thus, members 622, 624 are separated from each other in an associated channel. As this stage, coupling structure 620 is as shown in FIG. 10. As shown in FIG. 9, the first member 622 is extended at least partially into the channel 610*a* of the first component 101*a* and the second member 624 is extended at least partially into the channel 610*b* of the second component 101*b* so that the energy receiving structure 634 is generally adjacent to certain surfaces defining the associated channel.

Figure 11:
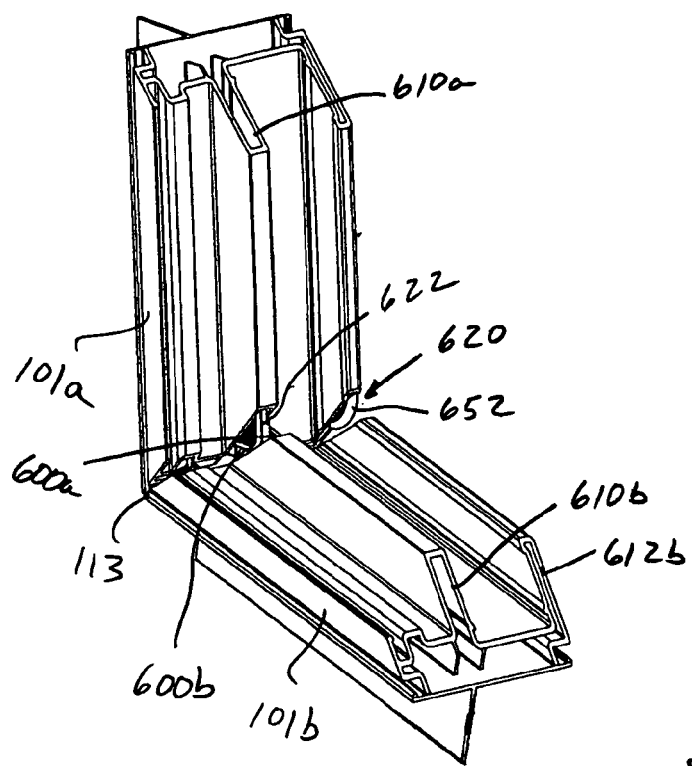
FIG. 11 is perspective view of the second component of FIG. 9 shown being moved about a hinge connection.
Figure 13:
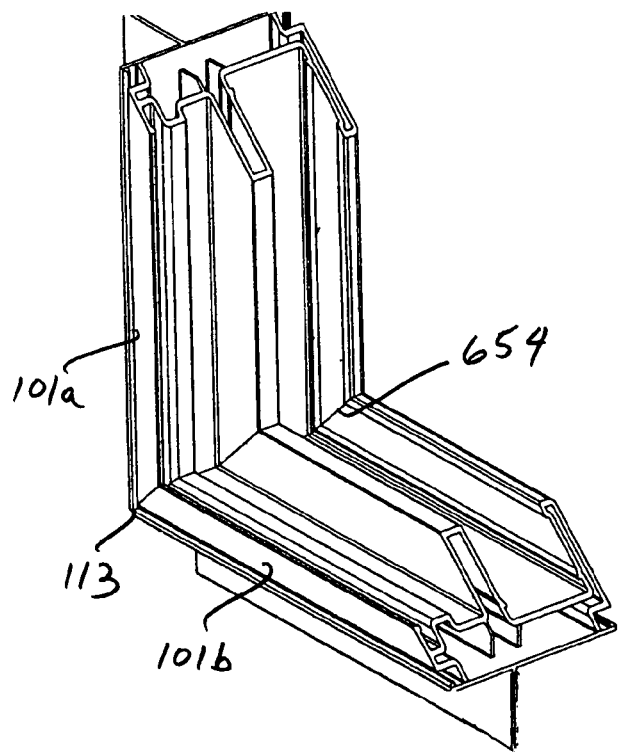
FIG. 13 is a perspective of first and second components and coupling and sealing structure therein, defining a corner of a window.
Figure 12:
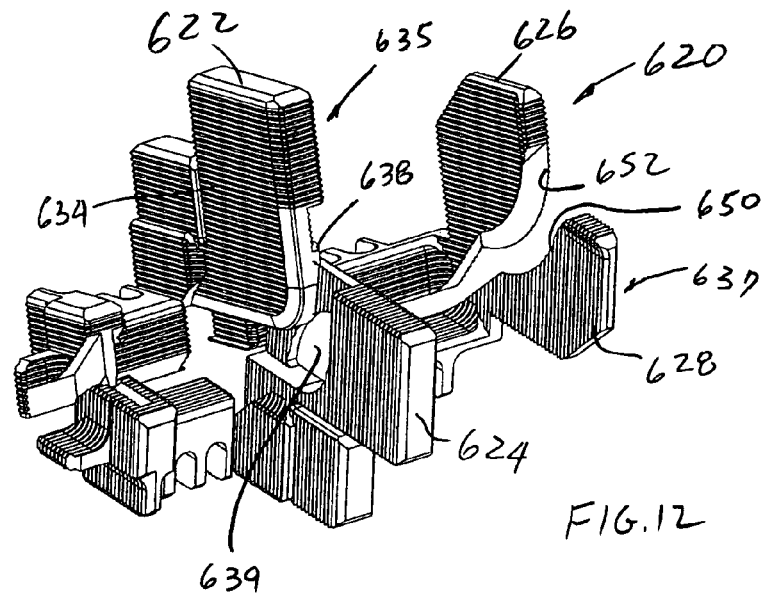
FIG. 12 shows a perspective view of the coupling and sealing structure in position when the first and second components are in the positions shown in FIG. 11.

Next, with reference to FIG. 11 the first component 101*a* is moved about hinge connection 113. At this stage, the position of the coupling structure 620 is shown in FIG. 12. The first and second components 101*a*, 101*b* are oriented so as to be generally 90 degrees apart so that the ends 600*a*, 600*b* are in generally abutting relation (FIG. 13).

Figure 14:
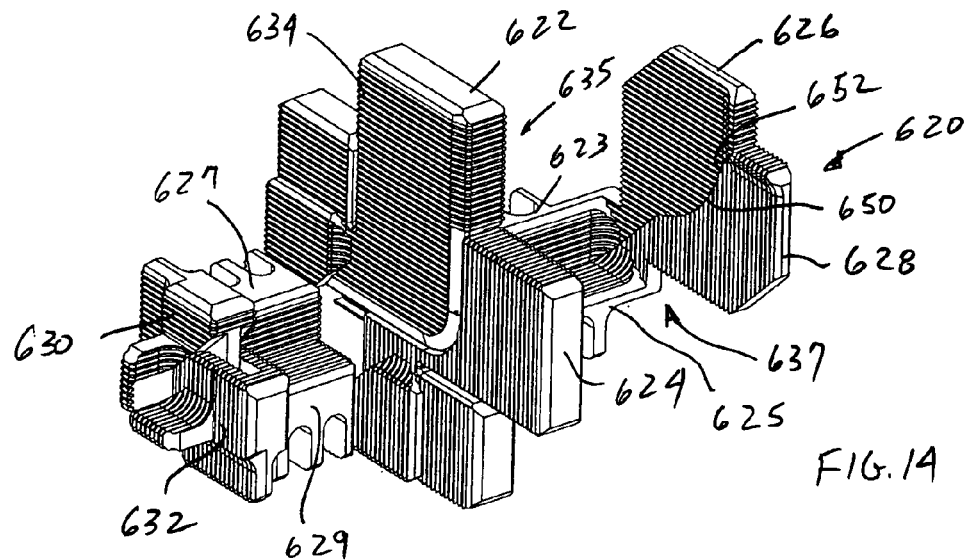
FIG. 14 shows a perspective view of the coupling structure in a locking position when the first and second components are in the positions shown in FIG. 12.

As best shown in FIG.12, the first and second members 622, 624 of the coupling structure have co-operating locking structure. Member 622 has a protruding key that is received in keyway 639 of the member 624. Of course, the mating parts can be reversed. The locking structure can take any form that permits the members 622 and 624 to interlock. Thus, when first and second components 101*a*, 101*b* are oriented to be generally 90 degrees apart (FIG. 13), the first and second members interlock via the locking structure as shown in FIG. 14).

In this closed, interlocked condition, energy is directed to the coupling structure 620 to cause the energy receiving structure 634 to fuse (e.g., be integrally joined) with the certain surfaces of the channels, thereby ensuring that the coupling structure 620 is integrally joined with the each of the first and second components 101*a*, 101*b*, respectively, so as to join the first and second components together.

In the illustrated embodiment, vibrational energy is used to cause vibration of each member 622, 624 with respect to the surfaces of the associated channel. When this occurs, the energy receiving structure 634 melt (fuse) to create an integral joint between the coupling structure and the surfaces defining the channels 610*a*, 610*b*. The vibrational energy can be delivered via a conventional ultrasonic sonic assembly having, for example, a generator that changes electrical power into electrical energy at a frequency such as 20 to 40 kilohertz, a transducer that converts the electrical energy of the generator into low amplitude mechanical motion or vibrations, a booster that increases or decreases the amplitude of the vibrations, and a horn of the proper size and shape to deliver the vibrational energy to the members 622, 624. Thus, vibration external to the components 101*a*, 101*b* causes fusing of the internally located coupling structure 620 to the components 101*a*, 101*b*. In the embodiment, parameters used in the fusing process were: 20 MHz power, 40 psi pressure and 0.750 second fusion time, with a 1.5 booster and an aluminum substrate with a chrome plated horn.

Since the first and second members 622, 624 of the coupling structure 620 extend within the channels 610a, 610b, the surface area of the connection between the coupling structure 620 and the first and second components 101a, 101b is substantially increased as compared to the conventional butt-welded joint.

It can be appreciated that when the first and second members 622 and 624 are joined with the associated component 101a, 101b, the members 626, 628, and members 623, 625 and members 627, 629 and members 630, 632 are also fused with the associated component 101a, 101b. With reference to FIG. 14, it can be appreciated that the bridging members 623 and 625 and bridging members 627 and 629 strengthen the corner and cooperate to define air and water pathways for enhancing weepage in the window system, as will be explained more fully below. Also, members 630 and 632 cooperate to strengthen one outer corner portion of the overall corner and members 626 and 628 cooperate to strengthen the other outer corner portion of overall corner. In that regard, and as shown in FIGS. 11 and 12, member 626 has a portion including surface 652 that extends into channel 614b to mate or be abutting with surface 650 of member 628 when assembled. These surfaces 650, 652 mate beyond the seam line 654 (FIG. 13) and ensure a smooth, clean outer seam line. In addition, when joined, members 626 and 628, members 630 and 632 and members 622 and 624 cooperate to define plugs to seal air and water, so that air and water may flow unobstructed and without leakage through the air and water pathways and thus to weep holes (not shown). Thus, no water can leak past the joint.

Thus, the integrity of the structure of the joint and the sealing properties of the embodiment is increased substantially. The coupling structure 620 distributes the pressure off of the corner seam-line and moves it to a number of places throughout the corner. In addition, the fusion of the coupling structure 620 with the components defines a generally smooth seam at the corner, thus, no divots, protrusions etc. that result from the conventional butt-welded corner occur.

Although fusing by employing vibrational energy is disclosed, it can be appreciated that other types of energy may be used such as heat energy, a chemical reaction (catalyst application), compression, or any other energy that is capable of joining components. Furthermore, in addition to, or in lieu of, fusing, adhesives and injection molding can be used to secure the coupling structure 620 with the first and second components 101a, 101b, respectively.

In the embodiment the first and second components 101a, 101b are preferably composed of vinyl material and the coupling structure is composed of plastic, preferably Acrylonitrile Butadiene Styrene (ABS). Materials of amorphous or semi-crystalline nature are within the contemplation of the invention. Since the coupling structure 620 is internal of the components 101a, 101b when finally assembled, the material thereof needs not meet weatherability and UV stabilization requirements.

Figure 15:
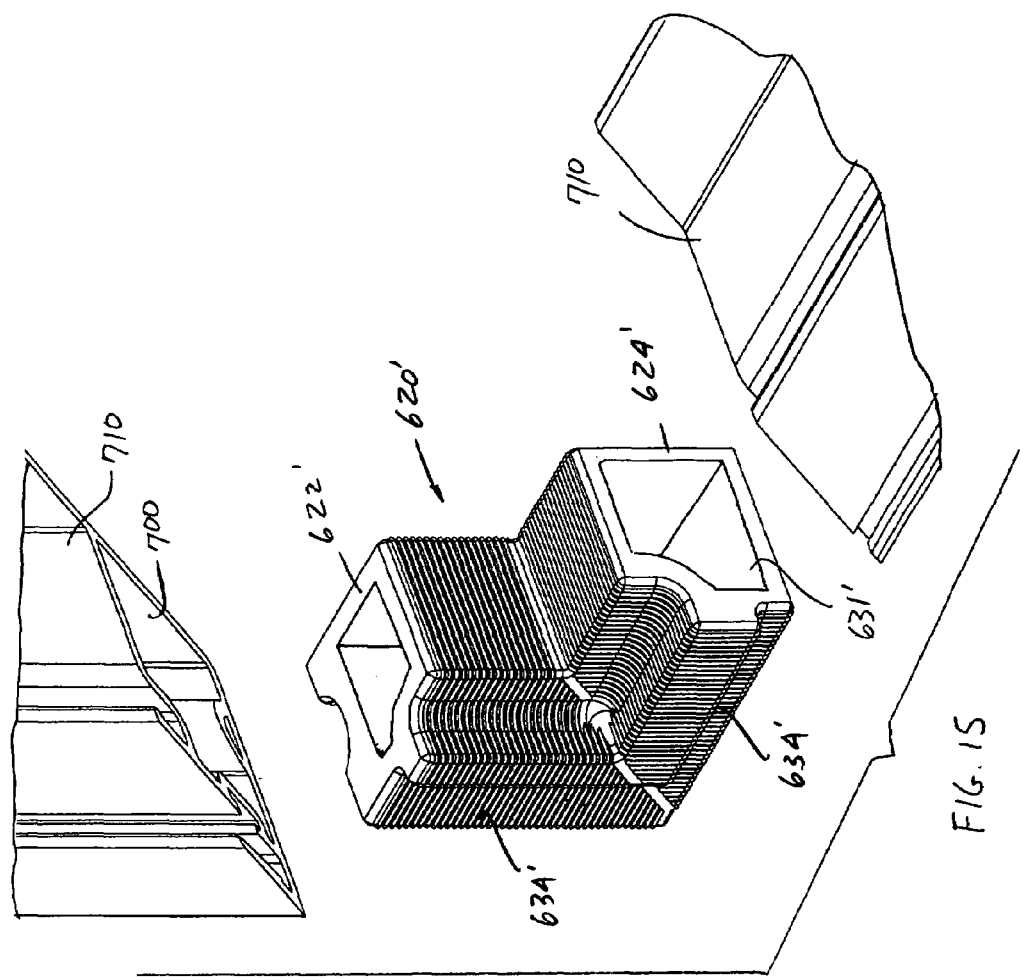
FIG. 15 is an exploded assembly view of coupling structures of a second embodiment of the invention.

Another embodiment of the coupling structure 620' is shown FIG. 15. The coupling structure 620' is a single component preferably having a first member 622' and an integral second member 624'. Each member has energy receiving structure 634' on at least a portion thereof to be fused to surfaces defining an associated channel 700 of a component 710, in the manner discussed above to join the two components 710. The coupling structure 620' also includes a pathway 631' for water and air flow. Thus, the joint formed by the coupling structure 620' is sealed by the coupling structure and water passes only through the pathway 631'. Hence, the invention is thus applicable to any structure having a channel therein.

With reference to FIGS. 16 and 17, the invention is also applicable to improving the nail fin 720 of a window. Conventionally, there is no corner defined on a nail fin of a window corner and the nail fin can become damaged in assembly or transport. With reference to FIG. 16, to strengthen the nail fin, a coupling structure 620" is located with respect to adjacent nail fins 720 by clips, snap-fit arrangement 730, etc. The coupling structure 620" includes energy receiving structure 634" that is fused with a portion of each nail fin 720. The coupling structure 620" preferably has a rounded portion to define a rounded corner so as to be resilient to bumps and drops that commonly occur in the installation process. Thus, a robust corner is provided on the nail fin.

Although the invention has been described with regard to window systems and in particular 90 degree corners thereof, it can be appreciated that the invention is applicable to doors, gates, or any structure that has components that are required to be joined at angles from about 20 to 180 degrees to form corners or other joints. The locking structure of the coupling structure can be constructed and arranged to lock at a variety of selected angles to accommodate joints of different angles. Furthermore, the invention is applicable to forming joints in structures having shapes other than square or rectangular. For example, polygonal structures, and/or structures having curved portions are within the contemplation of the invention.

The described embodiments of this invention are to be considered in all respects only as illustrative and not as restrictive. Although specific steps and window system components are illustrated and described, the invention is not to be limited thereto. The scope of this invention is, therefore, indicated by the claims. All changes, which come within the meaning and range of equivalency of, the claims, are to be embraced as being within their scope.

What is claimed is:

1. A method of joining two components of a frame comprising:
   providing first and second components each having an end and surfaces defining at least one channel open at the end and extending into the associated component,
   providing coupling structure having at least a first member and a second member, the coupling structure including energy receiving structure on each of the first and second members,
   ensuring that the first member extends at least partially into the channel of the first component and ensuring that the second member extends at least partially into the channel of the second component so that the energy receiving structure is generally adjacent to certain surfaces defining the associated channel,
   ensuring that the ends of the first and second components are in generally abutting relation, and
   directing sound energy to the coupling structure to cause the energy receiving structure to fuse with the certain surfaces, thereby joining the first and second components together.

2. The method of claim 1, wherein the first and second components are of vinyl material and are components of a frame of one of a door structure and window structure, with the abutting ends defining a corner of the structure with the coupling structure being encapsulated within the first and second components at the corner.

3. The method of claim 2, wherein the first and second components are coupled by a hinge connection at the ends thereof, the method further including orienting the first and second components so as to be generally 20 to 180 degrees apart with respect to the hinge connection with the ends in generally abutting relation, and thereafter performing the energy directing step.

4. The method of claim 3, wherein the first and second members have co-operating locking structure, the method including causing the first and second members to interlock via the locking structure when the first and second components are oriented to be generally 20 to 180 degrees apart.

5. The method of claim 2, wherein the first and second components are coupled by a hinge connection at the ends thereof, and wherein the coupling structure is a one-piece structure having a breakable portion, the method including, after the inserting step, causing the breakable portion to break so that the first and second members are separate from each other in an associated channel, orienting the first and second components so as to be generally 20 to 180 degrees apart with respect to the hinge connection with the ends in generally abutting relation, and thereafter performing the energy directing step.

6. The method of claim 5, wherein the first and second members have co-operating locking structure, the method including causing the first and second members to interlock via the locking structure when the first and second components are oriented to be generally 20 to 180 degrees apart.

7. The method of claim 1, wherein the step of directing energy includes providing the sound energy so as to cause vibration of each member with respect to the certain surfaces of the associated channel.

8. The method of claim 3, wherein the step of directing energy includes providing the sound energy so as to cause vibration of each member with respect to the certain surfaces of the associated channel.

9. The method of claim 5, wherein the step of directing energy includes providing the sound energy so as to cause vibration of each member with respect to the certain surfaces of the associated channel.

10. The method of claim 1, wherein the first and second components are composed of vinyl material and the coupling structure is composed of plastic.

11. The method of claim 10, wherein the plastic is Acrylonitrile Butadiene Styrene (ABS).

12. The method of claim 1, wherein the first and second members are integral.

13. A method of joining two components of a frame comprising:
providing first and second components each of vinyl material and having an end and surfaces defining at least one channel open at the end and extending into the associated component,
providing coupling structure having a first member and a second member,
ensuring that the first member extends at least partially into the channel of the first component and ensuring that the second member extends at least partially into the channel of the second component,
ensuring that the ends of the first and second components are in generally abutting relation, and
causing at least certain surfaces of the first and second members that are in the associated channel to be fused with certain surfaces of an associated channel thereby joining the first and second components together.

14. The method of claim 13, wherein the first and second members have cooperating locking structure, the method including utilizing the locking structure to cause the first member to be locked with respect to the second member.

15. The method of claim 13, wherein the step of causing at least certain surfaces of the first and second members to be joined includes providing a sound energy so as to cause vibration of each member with respect to the certain surfaces of the associated channel to fuse the certain surfaces of the first and second members with the certain surfaces of the associated channel.

16. The method of claim 13, wherein the first and second members are integral.

17. A method of coupling two components comprising:
providing first and second components,
providing a coupling structure between the first and second components, the coupling structure having energy receiving structure,
orienting the energy receiving structure to be adjacent to a portion of each component, and
directing sound energy to the coupling structure to cause the energy receiving structure to fuse with the portion of each component, thereby joining the first and second components together.

18. The method of claim 17, wherein the step of directing energy includes providing the sound energy so as to cause vibration of the coupling structure with respect to the each component to fuse the energy receiving structure with the portion of the associated first and second component.

19. The method of claim 17, wherein the first and second components are nail fins of a window and the coupling structure defines a corner between the first and second components.

20. The method of claim 19, wherein the coupling structure has rounded portion to define a rounded corner.

21. A method of forming a corner of a structure, comprising:
receiving material for processing, the material having surfaces defining at least one channel therein,
cutting the received material to a desired length,
forming at least one notch in the material by cutting the material at certain angles, the notch defining ends of first and second components, the first component including a first portion of the at least one channel and the second component including a second portion of the at least one channel,
providing a coupling structure to extend at least partially into each of the first and second portions of the at least one channel,
moving at least one of the first and second components so that the ends of the first and second components are in generally abutting relation thereby defining a corner, and
directing sound energy to the coupling structure to cause at least portions of the coupling structure that extend into each of the first and second portions to fuse with at least portions of the surfaces defining the at least one channel, thereby joining the first and second components together.

22. The method of claim 21, wherein the coupling structure includes first and second members having co-operating locking structure, the method including causing the first and second members to interlock via the locking structure during the moving step.

23. The method of claim 22, wherein the first and second members are joined together during at least a portion of the providing step, are then separated from each other and then interlocked during the moving step.

24. The method of claim 21, wherein the ends of the first and second components are joined by a hinge connection, the moving step including moving at least one of the first and second components about the hinge connection so that the ends of the first and second components are in generally abutting relation thereby defining the corner, with the coupling structure being encapsulated within the first and second components at the corner.

25. The method of claim 21, wherein the step of directing energy includes providing the sound energy so as to cause vibration of at least a portion of the coupling structure with respect to the surfaces defining the associated portion of the at least one channel.

26. The method of claim 21, wherein the coupling structure includes energy receiving structure, the providing step including ensuring that the energy receiving structure is generally adjacent to the surfaces defining the associated portion of the at least one channel, and the directing step includes directing energy to the coupling structure to cause the energy receiving structure to fuse with the surfaces defining the associated portion of the at least one channel.

27. The method of claim 22, wherein the first and second members are integral.

28. A method of coupling and sealing two components comprising:
   providing first and second components each of vinyl material, each component having an end and surfaces defining at least a one channel open at the end and extending into the associated component, the channel of the first component communicating the channel of the second component when the ends of the components are in generally abutting relation,
   providing coupling structure including energy receiving structure and pathway structure,
   ensuring that the coupling structure extends at least partially into the channel of the first component and at least partially into the channel of the second component so that at least a portion of the coupling structure is generally adjacent to certain surfaces defining the channels, the energy receiving structure being provided on at least said portion of the coupling structure,
   ensuring that the ends of the first and second components are in generally abutting relation, and
   directing sound energy to the coupling structure to cause the energy receiving structure to fuse with the certain surfaces, thereby joining, in a sealed manner, the first and second components together so that any water that enters the channels can flow through the pathway structure.

29. The method of claim 28, wherein the step of directing energy includes providing the sound energy so as to cause vibration of the coupling structure with respect to the certain surfaces.

30. The method of claim 28, wherein the first and second components are components of a frame of one of a door structure, a window structure, and a gate structure, with the abutting ends defining a corner of the structure and with the coupling structure being encapsulated within the first and second components at the corner.

* * * * *